(12) United States Patent
Mudiyanselage Nilantha Prasad Dhammika Gunaratne

(10) Patent No.: US 12,081,160 B2
(45) Date of Patent: Sep. 3, 2024

(54) AC MACHINE CONTROLLED VIA AMPLITUDE MODULATION

(71) Applicant: P Mudiyanselage Nilantha Prasad Dhammika Gunaratne, Cherrybrook (AU)

(72) Inventor: P Mudiyanselage Nilantha Prasad Dhammika Gunaratne, Cherrybrook (AU)

(*) Notice: Subject to any disclaimer, the term of this patent is extended or adjusted under 35 U.S.C. 154(b) by 224 days.

(21) Appl. No.: 17/776,577

(22) PCT Filed: Jun. 30, 2020

(86) PCT No.: PCT/AU2020/050678
§ 371 (c)(1),
(2) Date: May 12, 2022

(87) PCT Pub. No.: WO2021/092644
PCT Pub. Date: May 20, 2021

(65) Prior Publication Data
US 2022/0399839 A1     Dec. 15, 2022

(30) Foreign Application Priority Data
Nov. 15, 2019 (AU) .................. 2019904310

(51) Int. Cl.
*H02P 8/32* (2006.01)
*H02P 8/18* (2006.01)

(52) U.S. Cl.
CPC . *H02P 8/18* (2013.01); *H02P 8/32* (2013.01)

(58) Field of Classification Search
CPC ........ H02K 17/24; H02K 19/12; H02K 37/14; H02K 41/03; H02P 1/26; H02P 1/24;
(Continued)

(56) References Cited

U.S. PATENT DOCUMENTS

| 7,180,263 | B2 | 2/2007 | Maeda et al. |
| 2006/0091845 | A1 | 5/2006 | Consoli et al. |

FOREIGN PATENT DOCUMENTS

| DE | 10240704 A1 | 4/2004 | |
| JP | 08154369 A | * 6/1996 | .......... B60L 11/1803 |
| WO | 2013045978 A1 | 4/2013 | |

OTHER PUBLICATIONS

Take Takashi, Modulation Control AC Machine and Apparatus using IT, Jan. 1, 2013, Copyright 2024, Clarivate Analytics, pp. 1-56 (Year: 1996).*

(Continued)

*Primary Examiner* — Antony M Paul
(74) *Attorney, Agent, or Firm* — Maschoff Brennan

(57) ABSTRACT

AC motor rotates independent from power frequency gives advantages in size and controllability. Oscillating and rotating magnetic field is created across airgap by using Amplitude Modulated input. Higher frequency (Carrier) is the power input and the lower frequency (Signal) determines speed of the motor. Stator and Rotor work as primary and secondary of transformer, rotor windings are arranged to keep resultant EMF generated within the winding as zero when rotor aligned with stator magnetic field and increase when deviates. The current generated on deviated rotor winding creates a push back torque keeping the rotor aligned with magnetic field. This interlocks magnetic field and the rotor. Two different frequencies are applied at either end of the stator windings so that the current flow through each winding become amplitude modulated, average of the two frequencies become carrier frequency and control frequency is half of the difference between two frequencies.

19 Claims, 8 Drawing Sheets

(58) Field of Classification Search
CPC .... H02P 1/42; H02P 1/46; H02P 1/465; H02P 6/00; H02P 6/005; H02P 6/06; H02P 6/08; H02P 6/12; H02P 6/14; H02P 6/182; H02P 6/28; H02P 6/32; H02P 7/00; H02P 7/282; H02P 7/29; H02P 8/00; H02P 8/30; H02P 21/22; H02P 23/08; H02P 21/26; H02P 25/00; H02P 25/024; H02P 25/022; H02P 25/03; H02P 25/032; H02P 25/062; H02P 25/064; H02P 25/066; H02P 27/00; H02P 27/06; H02P 27/08; H02P 2207/05; H02P 2203/03; H02P 8/14; H02P 8/32; H02P 25/08

See application file for complete search history.

(56) References Cited

OTHER PUBLICATIONS

Liu et al., Novel Sensorless Control Strategy With Injection of High-Frequency Pulsating Carrier.

\* cited by examiner

A
STARTING POINT AND
END POINT OF THE WINDINGS

AC MACHINE CONTROLLED VIA AMPLITUDE MODULATION

FIELD OF THE INVENTION

This invention relates to AC electric machines and stepper motors.

BACKGROUND ART

Electric machines in the form of motors or generators are one of the most commonly used technologies in today's world and Stepper motors are one of the most common application of electric machines in the area of control systems and automation.

AC induction motors are one of the most resilient and economical types of motors but have limitations in controlling the speed in wide range, especially in low speeds. And cannot be used as stepper motors as torque is created only when magnetic field is rotating and in the direction of rotation.

Power density (Power to weight ratio) of AC motor can be increased by using higher operating frequency, but the speed of the AC motor is always a factor of operating frequency, this limits the capability of building low speed motors with high power density.

With the rapid development of electric vehicles and electricity driven flying sources there is high demand for small and light weight motors with high power and a wide range of speed.

The main limitation of Stepper motor is angular resolution, better the angular resolution the torque and efficiency of the motor goes down. Overshot and ringing is another issue with stepper motor when smooth controlling is required.

When AC motors are controlled by Variable Frequency Drives, design optimization is required for wider range of frequencies, it is difficult challenge to develop a motor to produce same performance through all frequency ranges.

AC motor where rotating speed is independent to operating frequency will have many advantages in developing motors with high power density and flexible speed controlling. Also, when rotating speed (RPM) is independent from operating frequency the motor can achieve 0 RPM at any frequency with high torque, providing stepper motor with very high angular resolution.

When motor is designed to work on one fixed operating frequency, better optimized and efficient motors can be developed.

BRIEF DESCRIPTION OF THE DRAWINGS

The present systems and methods correspond to AC electric machines and stepper motors, wherein.

DISCLOSURE OF THE INVENTION

Figure 1:
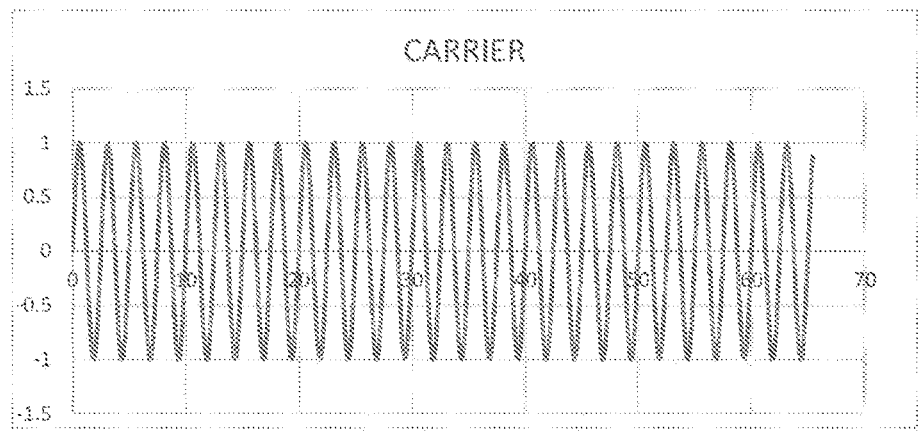
FIG. 01 illustrates a carrier input, in accordance with one or more embodiments of the present disclosure.

The basic principle of torque in electric motors is stator creates moving magnetic field and rotor get locked into the moving magnetic field.

There are four common concepts for this.
1. Rotor with current carrying conductors where brushes and commuter or slip rings are used to inject current into the rotor.
2. Rotor uses relative speed (Slip) with moving magnetic field to generate current and operated without brushes (Induction motor)
3. Permanent magnet which follows moving magnetic field
4. Directional rotor to create minimum magnetic reluctance path and align with moving magnetic field.

The main invention of this novel motor is how rotor conductors generate current without having brushes or slip. The system creates oscillating magnetic field across air gap and rotor windings act like secondary winding of a transformer to generate current as stator winding act as the primary winding.

In accordance with one aspect of the present invention there is provided an electric machine including a stator and an armature having an auxiliary system, wherein the auxiliary system creates an oscillating magnetic field across the airgap at the frequency of supply voltage. The position/rotating speed of the magnetic field is controlled by an independent signal from the supply frequency. This allows to control the motor in wide range of speeds including zero RPM (stand still).

This creates a motor which operates in zero to very high-speed range irrespective of operating frequency. The ability to be locked in and have zero RPM creates a stepper motor with very high angular resolution, flexibility and better controlling ability.

The concept used to create oscillating and rotating magnetic field is Amplitude modulation of two frequencies where frequency 1 is motor operating frequency and frequency 2 is motor control frequency.

Preferably, in the motor application, the electric machine is an electric motor designed to use a signal derived from at least two frequencies to operate the motor:

one frequency being a carrier frequency derived from an input to power the motor including a fixed phase AC power source; and the other frequency being a control for controlling the speed of the motor;

wherein the signal at the one frequency is amplitude modulated by the signal at the other frequency to control the speed of the motor.

Preferably, the frequency of the power input can vary from a low frequency up to very high frequency depends on the material used. Approximate Maximum of 400 Hz can be used when steel is used as construction material. Frequencies higher than 400 Hz can be implemented using material with high magnetic permeability and low electrical conductivity.

Preferably, the carrier comprises power input frequency. The signal comprises three phase or single-phase voltage varies from 0 Hz to half of the carrier frequency, and the speed of the motor depends on frequency of the signal.

I Case of Three Phase Motor

Preferably, all three phases of the control signal are amplitude modulated with the carrier frequency to create a three-phase input to the motor.

Preferably, the two frequencies are demodulated in the rotor at the final stage of torque production to create a rotating magnetic field with oscillating amplitude, whereby the other frequency (Signal) determines the rotation speed of the magnetic field and the one frequency (Carrier) determines the oscillation frequency of the rotating magnetic field.

Preferably, the armature is in the form of a rotor having windings arranged so that the vector sum of the EMF across all windings are zero at no deviation angle between oscillating magnetic field and rotor symmetric axis.

Preferably, pairs of windings are symmetrically arranged on the axis of the main winding and interconnected in series to cancel out the EMF created.

Amplitude Modulated input to the motor can be created using two Variable Frequency Drivers Preferably, two different frequencies are applied at either end of a said stator winding so that the current flow through each phase winding becomes amplitude modulated, where the carrier frequency is the average of the two different frequencies that are applied and the control frequency is half of the difference between the two different frequencies that are applied.

In accordance with another aspect of the present invention, there is provided an electric machine comprising three different stators and rotors of aforementioned aspects of the electric machine for connecting to a variable frequency drive so that the respective carrier frequencies of the three stator sets are 120° phase shifted providing for the torque curves of each parallel segment to be 120° phase shifted from each other resulting in constant torque on the rotor and load balancing of each phase.

In accordance with a further aspect of the present invention, there is provided a method for controlling an electric machine or generating a signal from an electric machine of the form defined in any one of the preceding aspects of the invention.

BEST MODE AND DRAWINGS

Now describing various modes embodying different aspects of the invention, these embodiments address various tasks and concepts and provide solutions overcoming various problems associated with same.

These embodiments are described with reference to the accompanying drawings including graphs and figures that are incorporated into the description as well as being provided separately at the end of the specification.

PREFERRED MODE(S) FOR CARRYING OUT THE INVENTION

The preferred mode for carrying out the invention is involved with the following task and concept.

In a First Embodiment

Figure 2:
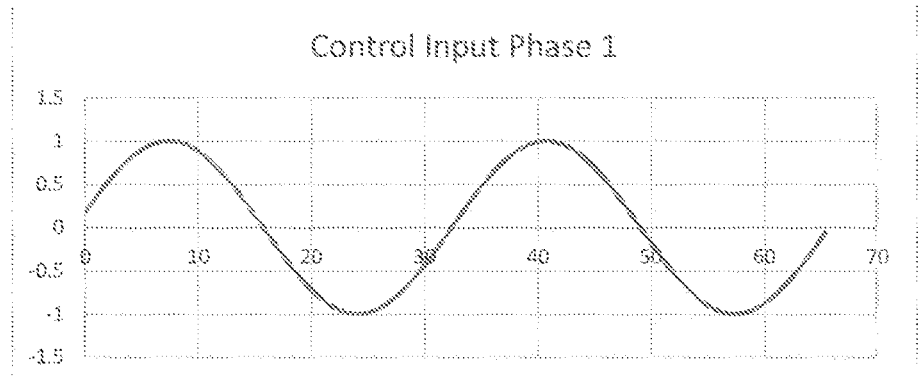
FIGS. 02-04 illustrates a signal input when a three (3) phase machine is used, in accordance with one or more embodiments of the present disclosure.
Figure 3:
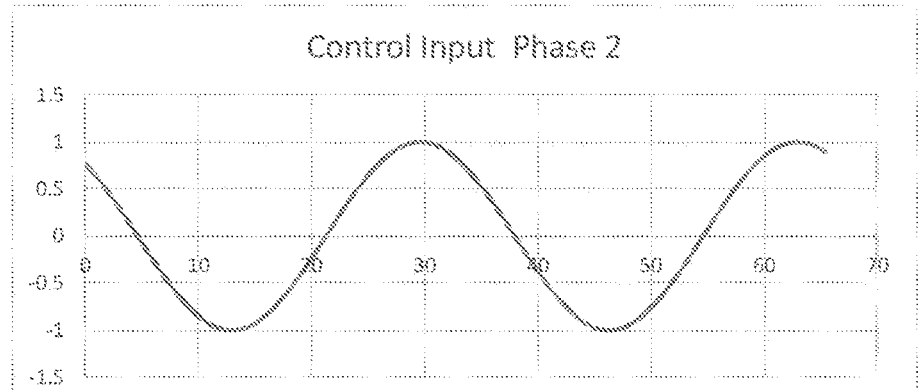
Figure 4:
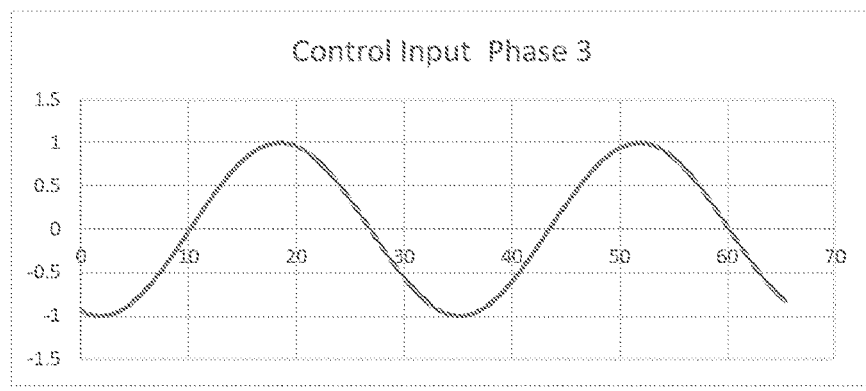
Figure 5:
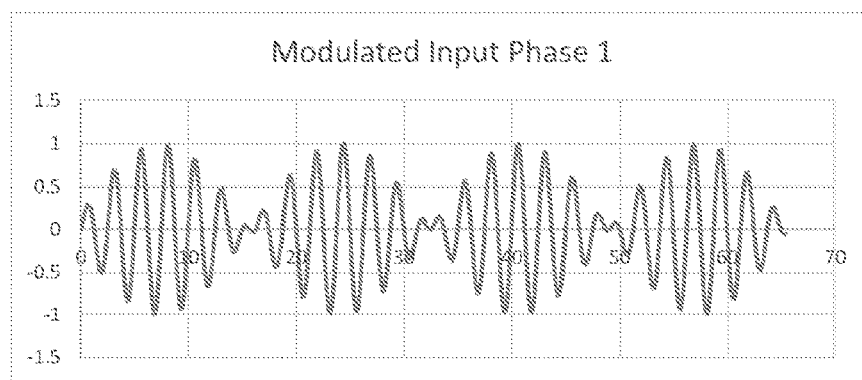
FIGS. 05-07 illustrates three (3) phases of the control signal that are amplitude modulated with the carrier frequency to create three phase input to the motor, in accordance with one or more embodiments of the present disclosure.
Figure 6:
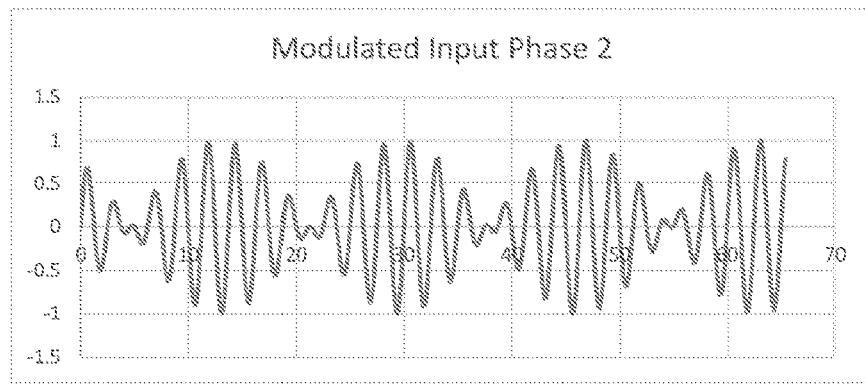
Figure 7:
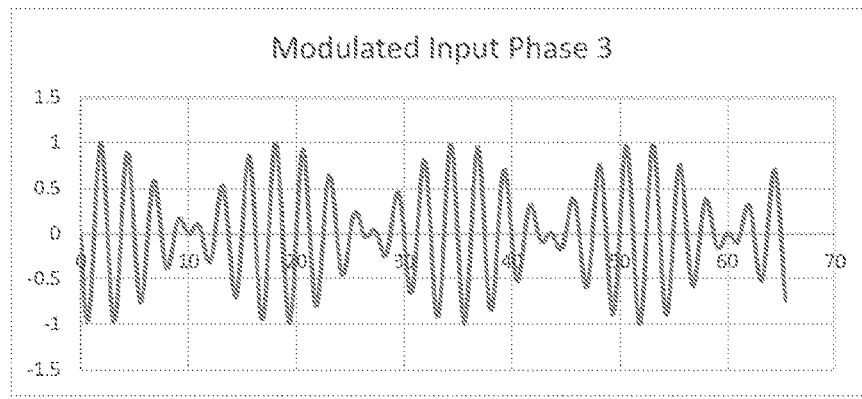
Figure 8:
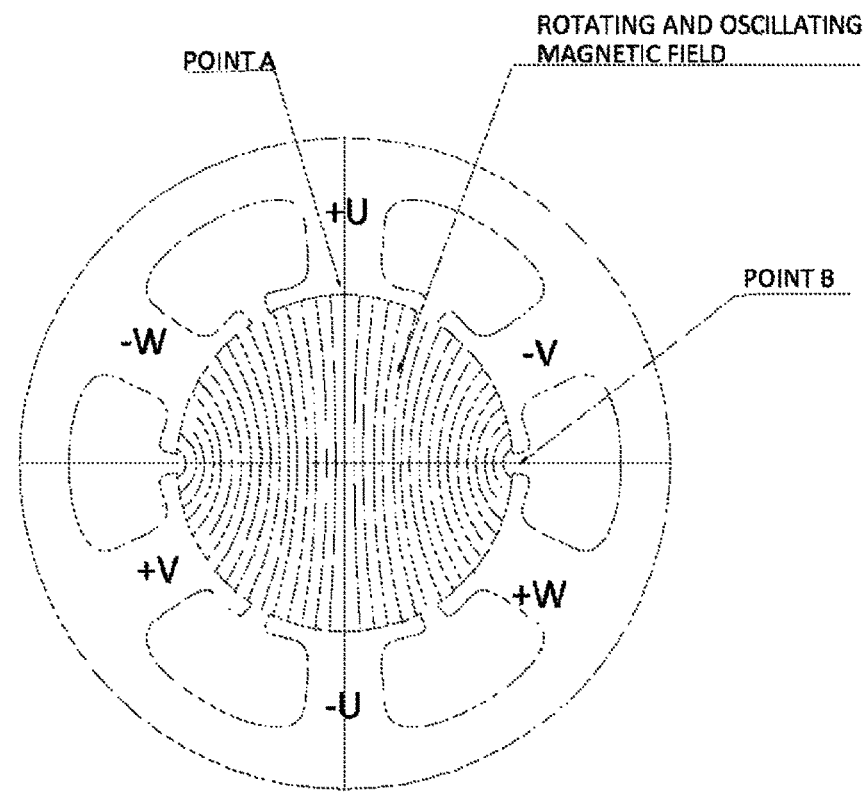
FIG. 08 illustrates a rotating and oscillating magnetic field across air gap and the rotor, in accordance with one or more embodiments of the present disclosure.

Task—Develop an AC Machine where the RPM is independent from power supply frequency
Concept
Use Two Frequencies to Operate the Motor
  1. Frequency 1—Power Input (carrier)
    The input which powers the motor consists of a fixed frequency single phase AC power source. It can vary from a low frequency up to 400 Hz (Depends on the characteristics of the electrical steel) FIG. 01 shows the carrier input
  2. Frequency 2—Control Input—signal
    The signal which controls the speed of the motor, consist of three phase or single phase and can vary from 0 Hz to half of the power input frequency for best operation.
    When control inputs are 0 Hz (DC), the motor will not rotate but torque will still be produced and lock the motor in one position. FIG. 02, FIG. 03, FIG. 04 shows signal input when 3 phase machine is used,
  The final Input to the motor is created By Amplitude Modulating above two frequencies, using Frequency 1 as the carrier and Frequency 2 as the signal.
  FIG. 05, FIG. 06, FIG. 07 shows, all three phases of the control signal are amplitude modulated with the carrier frequency to create three phase input to the motor.
  Demodulation of the two frequencies will happen in the Rotor at the final stage of torque production, creating a rotating magnetic with oscillating amplitude.
  FIG. 08 shows the Rotating and oscillating magnetic field across air gap and the rotor
  Frequency 2 will determine the rotation speed of the magnetic field and Frequency 1 will determine the oscillation frequency of the rotating magnetic field.
  When Frequency 2 is 0 Hz, it creates stand still oscillating magnetic fields across the core of the motor, thus allowing the motor to be used as a stepper motor.
  The angular resolution of the stepper motor is solely dependent on the accuracy of the input frequency which can be easily improved with higher quality Variable Frequency Drives.
  Stopping sequence of the motor can be improved by introducing a pre-defined de-acceleration curve, allowing for smoother stops with almost zero or minimal overshooting and ringing.

In a Second Embodiment

Challenge—Develop a rotor to get locked in to rotating and oscillating magnetic fields and provide torque even at zero RPM.

Solution—Vector EMF Controlled Rotational Symmetric Rotor

Stator creates an oscillating magnetic field and the rotor winding loops across the oscillating magnetic field, this work like transformer where the stator is the primary and rotor winding is the secondary.

Figure 9:
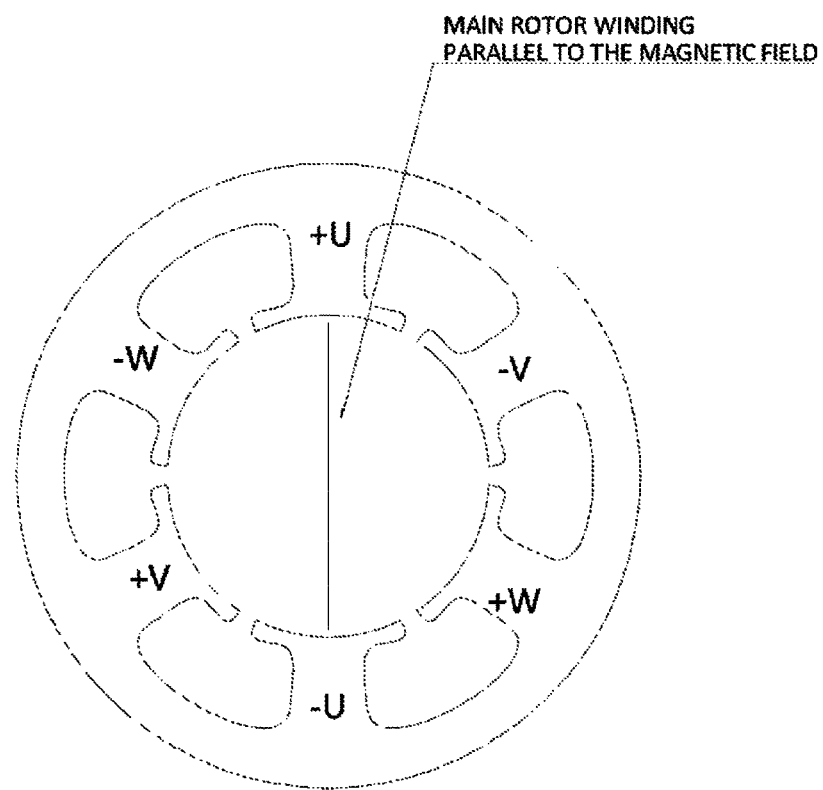
FIG. 09 illustrates rotor windings in a single slot across oscillating magnetic field, in accordance with one or more embodiments of the present disclosure.

FIG. 09 shows Rotor windings in a single slot across oscillating magnetic field

As shown in FIG. 09 if rotor winding is positioned parallel to the magnetic field where there is no magnetic flux across the winding and therefore no current.

The amount of flux going across rotor winding depends on the angle between the magnetic field and the winding. When angle is zero (parallel to the fields) there is no current and torque. When the deviation angle increases, it increases the current on winding which results torque on the rotor.

When an external torque applied on rotor, the winding will rotate away from the magnetic field until the counter torque on the winding becomes equal to the external torque.

When the magnetic fields start rotating, the winding (Rotor) follows the rotating magnetic. The rotor will have the same RPM of rotating magnetic field (As in a synchronous motor).

Windings of single slot at the center of rotor as in FIG. 9 got two major issues
1. Single set of winding does not provide adequate torque to operate the motor.
2. Magnetic field distribution across airgap is near sinusoidal around the rotor, peak is at point A as marked in FIG. 08 and zero at Point B, the torque created is based on current and the MMF, as MMF reduces when conductor moves from point A to point B the torque is not increased proportional to the current.

Multiple winding slots with same current on each is required to overcome above two issues.

Figure 10:
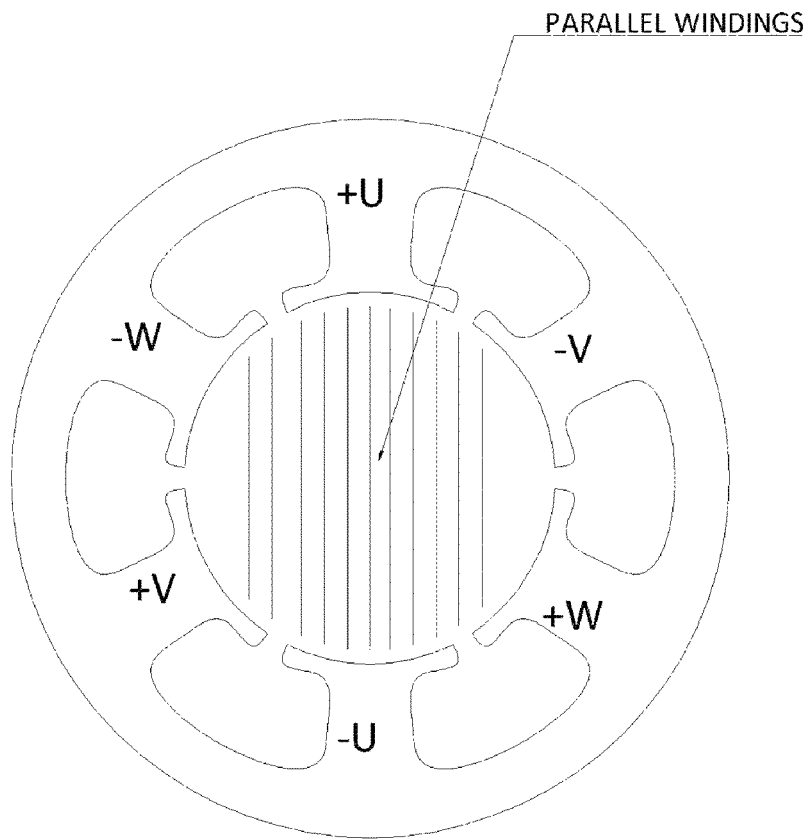
FIG. 10 illustrates multiple parallel windings across a rotor, in accordance with one or more embodiments of the present disclosure.

Having multiple parallel windings across the rotor as per FIG. 10, will not provide desired solution, as current on each winding got different phase angles with the magnetic flux.

To generate current with the same phase the windings needs to be rotationally symmetric across the rotor.

Figure 11:
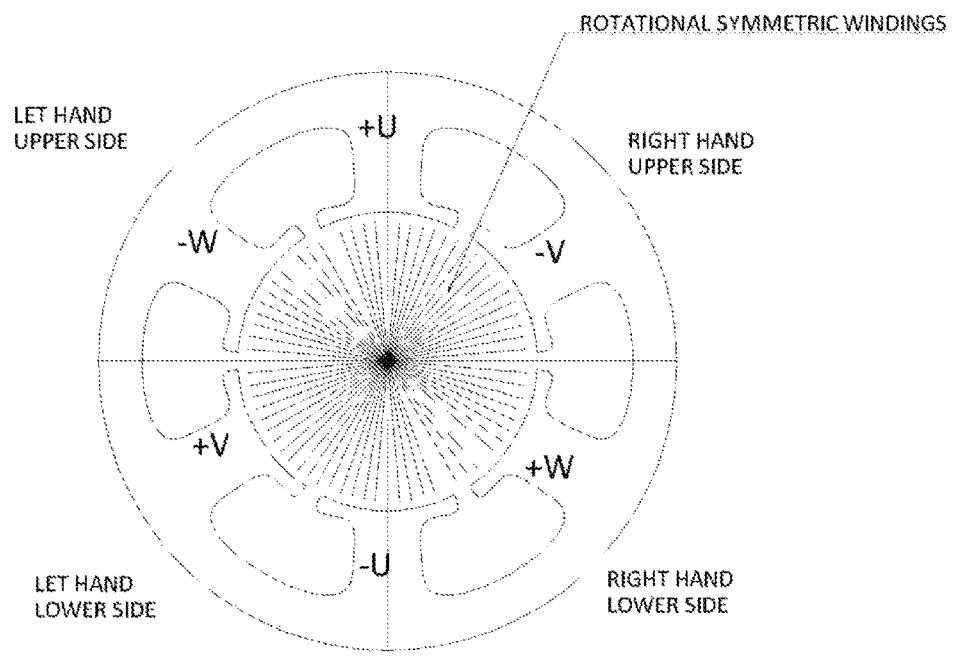
FIG. 11 illustrates rotationally symmetric windings across a rotor, in accordance with one or more embodiments of the present disclosure.

FIG. 11 shows rotationally Symmetric windings across Rotor

The windings between the left-hand upper side and right hand lower side slots create an anticlockwise torque and Windings between the right-hand upper and left hand lower side slots create clockwise torque. This is not the desired output, and results in excessive heat and power loss.

To overcome this challenge the windings were arranged in a manner that the vector sum of the EMF across all windings are zero at no deviation angle.

Two windings that are symmetric on the axis of the main winding will be interconnected in series to cancel out the EMF created.

Figure 12:
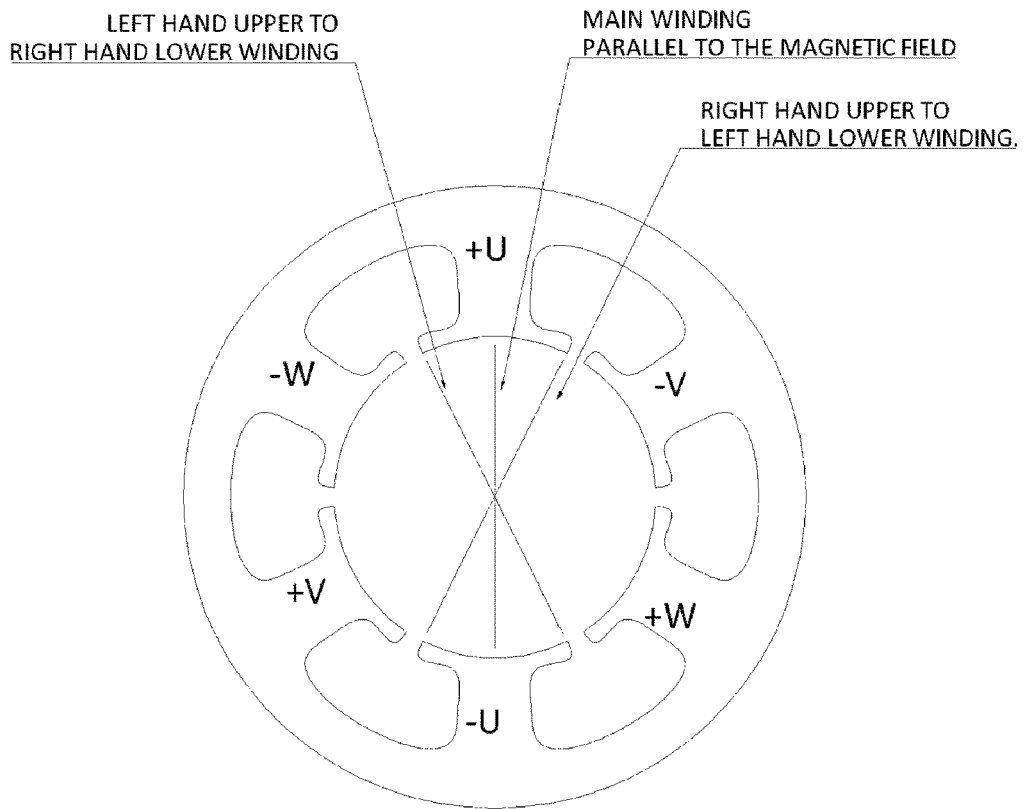
FIG. 12 illustrates two symmetric windings with no deviation angle, in accordance with one or more embodiments of the present disclosure.

FIG. 12 shows Two symmetric windings with no deviation angle

When the rotor has no deviation angle, the flux going through each winding is same and therefore the same EMF is generated in both windings resulting in no current flow and thus no torque.

Figure 13:
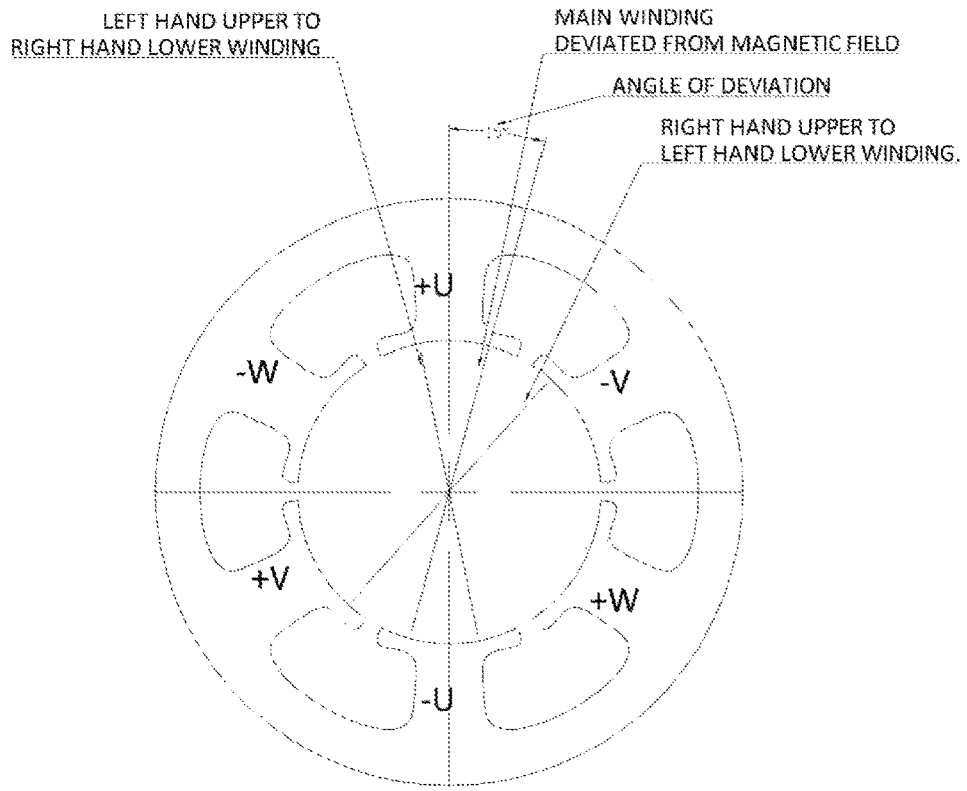
FIG. 13 illustrates a view of the rotor moving clockwise, in accordance with one or more embodiments of the present disclosure.

When the rotor moves clockwise due to an external torque, as shown ion FIG. 13 the angle of the left-hand upper to right hand lower windings to magnetic field decrease, and the angle of right-hand upper to left hand lower windings increase.

Therefore, EMF of the coil from left-hand upper to right hand lower goes down and EMF of the coil from right-hand upper to left hand lower coil goes up, generating a current across both the coils in phase with the magnetic field, which creates torque.

The torque can be improved significantly by adding multiple slots and windings across the rotor which are symmetrically distributed and interconnected to have an EMF vector sum of zero.

As all windings are connected series same current passes through all and in phase with magnetic field.

Figure 14:
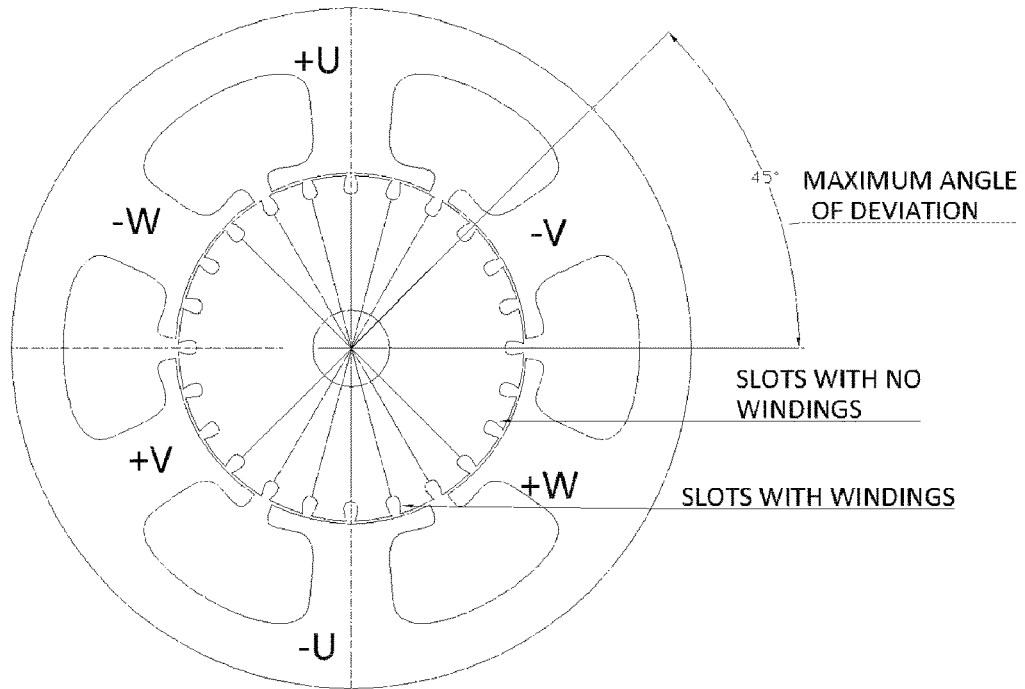
FIG. 14 illustrates a rotor with multiple winding of 24 slots, 14 slots are filled with windings and 10 slots are free, in accordance with one or more embodiments of the present disclosure.

FIG. 14 shows a Rotor with multiple winding of 24 slots, 14 slots are filled with windings leaving 10 slots free. Free slots are to allow required angle of deviation without moving windings to other side of the magnetic field. If any winding moves to the other side, it creates reverse torque and make the motor slips.

Figure 15:
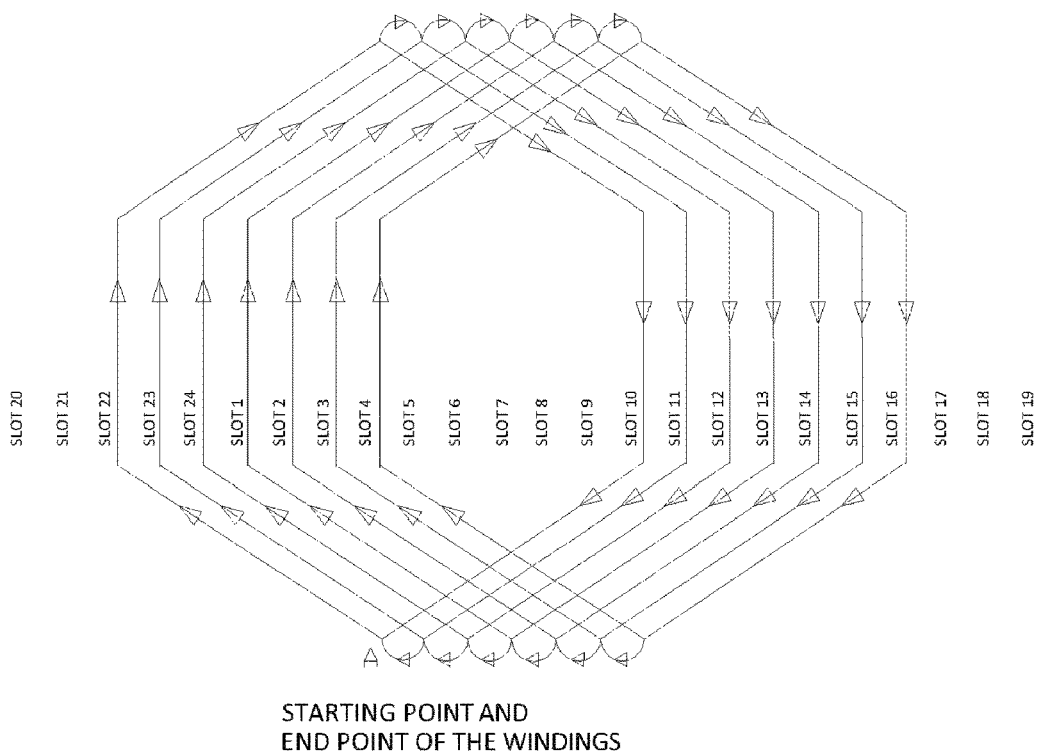
FIG. 15 illustrates a winding direction and pattern of 24 slot rotor where 14 slots are occupied, in accordance with one or more embodiments of the present disclosure.

Maximum angle of deviation of the rotor (Breakdown point) has to be decided on required torque and the configuration of stator winding FIG. 15 shows the winding direction and pattern of 24 slot rotor where 14 slots are occupied. The main winding occupies slot 1 and 13. Winding can be started at any corner slot (FIG. 15 shows A which is slot 22 as the starting point). Winding should go towards the other direction by filling half of each slot and once reach last slot it should start coming back filling other half of the slots. End of the winding comes to the starting slot allowing to make one loop across all the slots and with perfect symmetry.

Above configuration is for 2 Pole machine and same concept can be used for 4 Pole or 6 Pole machine and higher the no of poles the motor can generate higher torque with less angle of deviation.

Figure 16:
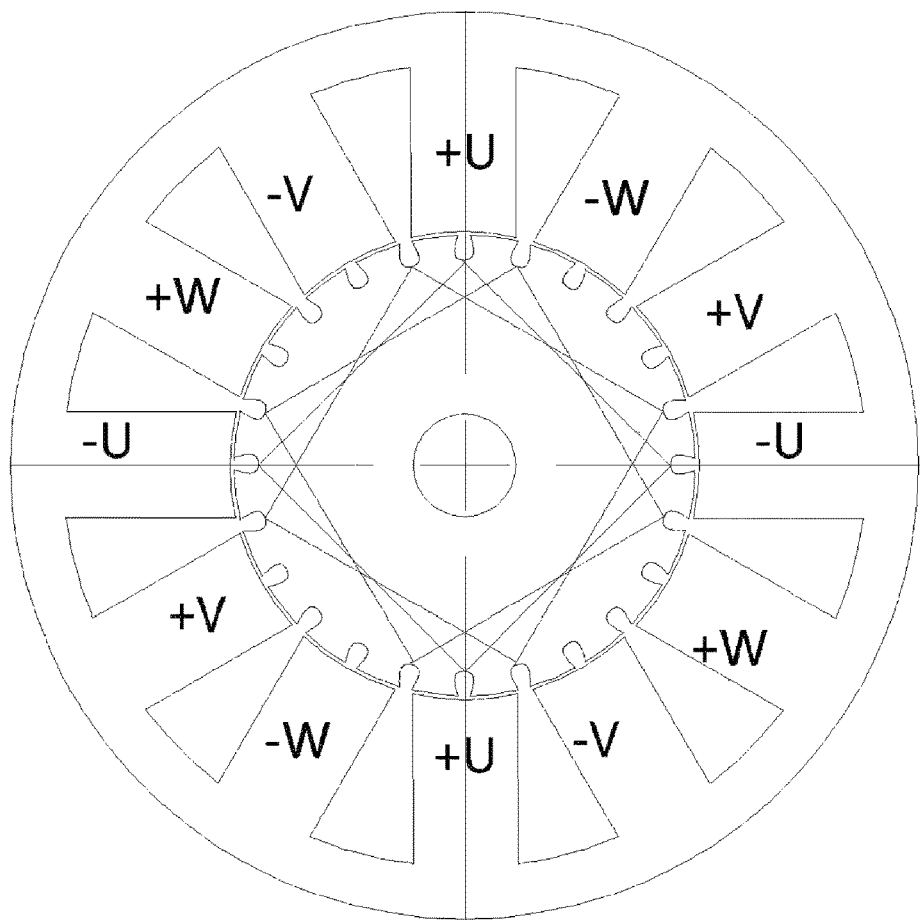
FIG. 16 illustrates examples of rotor windings arranged as symmetric across adjacent opposite poles, in accordance with one or more embodiments of the present disclosure.

In the case of more than two pole machine the rotor windings are arranged as symmetric across adjacent opposite poles as shown in FIG. 16.

Figure 17:
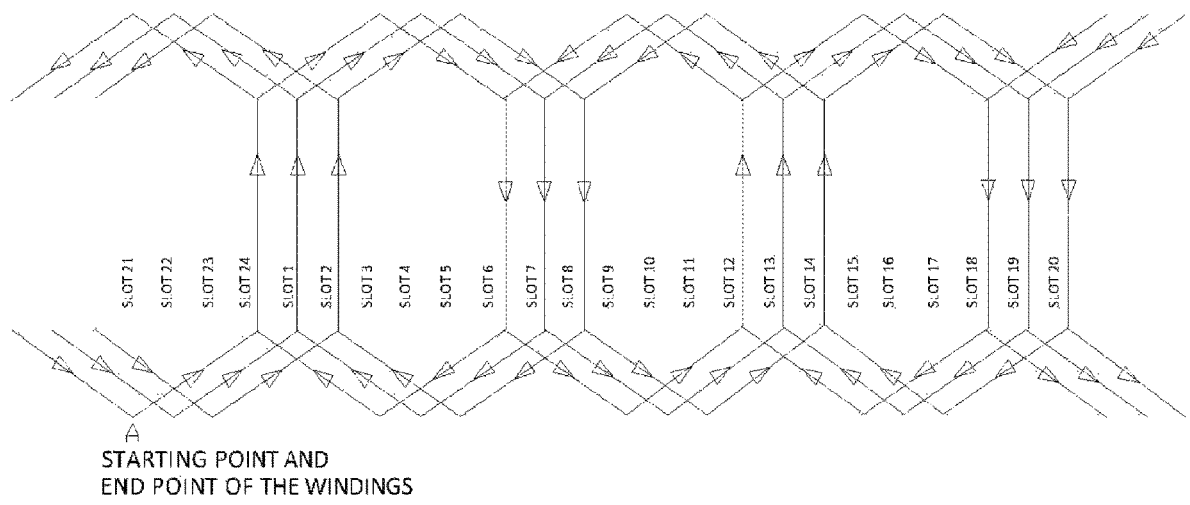
FIG. 17 illustrates a winding direction and pattern of a 24-slot rotor for 4 pole where 12 slots are occupied, in accordance with one or more embodiments of the present disclosure.

FIG. 17 shows the winding direction and pattern of 24 slot rotor for 4 pole, 12 slots are occupied. The main winding occupies slot 1, 7, 13 and 19. Winding can be started at any corner slot (FIG. 17 shows A which is slot 24 as the starting point). Half of each slot is filled by Winding goes to left hand side pole and other half go to right hand side pole. After going around the rotor the end of the winding comes to the starting slot allowing to make one loop across all the slots and with perfect symmetry.

When no of poles increases, the angle of deviation required decreases. If design calculation is done so that angle of deviation is less than half the angle between two winding slots of the rotor, there will be no winding free slots, this makes more optimize motor.

No of slots of the rotor and occupied slots, are variables depends on number of poles, torque required, allowable maximum deviation angle, allowable deviation angle per unit increment of torque.

Controlling as Stepper Motor

When the signal frequency is set to zero the magnetic field stop rotating and keep oscillating across the air gap where rotor is locked in, creating a stepper motor with very high holding torque.

The angular position of the stepper motor is determined by the point where the signal frequency made zero (the direction of oscillating magnetic field) and the angle of deviation due to torque.

The current thru each phase is directly proportional to angle of deviation,

Angle of Deviation=$K$×Current (Where $K$ is constant as per motor design)

When this is used as stepper motor, the control system can assess the exact angular position by using position of resultant magnetic field and angular deviation.

When stepper works on variable torque environment, it change the angle of deviation. The exact position of the rotor can be maintained only adjusting the position of resultant magnetic field. This makes controlling this motor as a stepper motor is more cost effective and flexible than conventional stepper motor, there is no requirement of adjusting the voltage to maintain the position with varying torque.

The rotational speed (Frequency of the signal) can be controlled to achieve smooth deacceleration and stop to avoid or minimize ringing and overshoot when motor stops.

In a Third Embodiment

Figure 18:
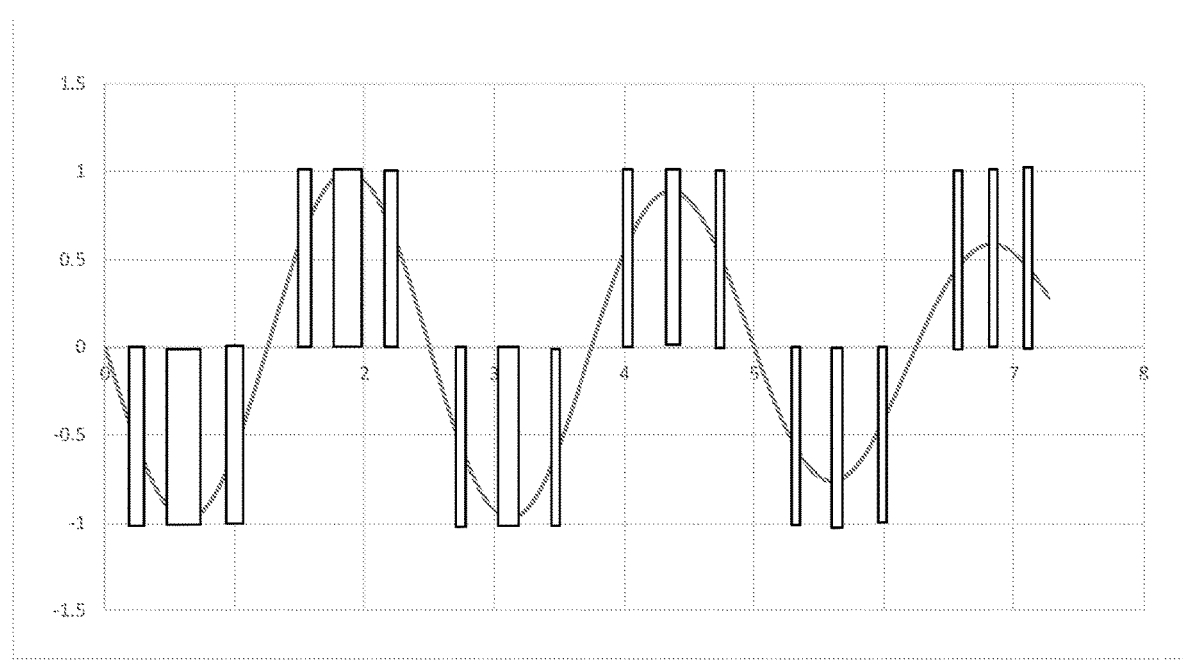
FIG. 18 illustrates an example amplitude modulated output that can be generated by using PWM, in accordance with one or more embodiments of the present disclosure.

Challenges—Requirement of expensive Electronic components, Inefficiency and complexity of amplitude modulation at high power and high voltage.
Solution
Option 1—Use Single PWM Sequence to Create Amplitude Modulated Input
Amplitude modulated output can be generated by using PWM as shown in FIG. 18 where width of the pulses are maintained to keep at same frequency and change the voltage.
Option 2—Amplitude Modulation Using Two VFDs If voltage of two different frequencies (f1 and f2) are applied in to either end of an inductor the actual voltage on inductor terminals will become amplitude modulated output where (f1−f2)/2 is signal and (f1+f2)/2 is carrier as shown below. This provides AM input with less harmonics and high accuracy.

$$\sin[2\pi f1] - \sin[2\pi f2] = 2\sin\frac{1}{2}[2\pi([f1-f2)]\cos\frac{1}{2}[2\pi(f1+f2)]$$

Amplitude modulation can be done more efficiently by applying above concept and using stator winding as the modulator.

Two variable frequency drives are connected to the stator windings of the motor to create an amplitude modulated voltage pattern.

One end of the winding must be connected in the sequence U1, V1, W1 (Outputs of VFD1) and the other end has to be connected in the sequence of U2, W2, V2.

Connection Sequence of Three Phases
Phase 1—U1 and U2 (Applied voltage U1-U2)
Phase 2—V1 and W2 (Applied voltage V1-W2)
Phase 3—W1 and V2 (Applied voltage W1-V2)
This is to make sure that the power input signals are in phase in all three phase inputs and the control signals are 120° phases shifted.

$U1=A\ \text{Sin}(2\pi f1), V1=A\ \text{Sin}(2\pi f1+120), W1=A\ \text{Sin}(2\pi f1+240)$   VFD1(Frequency f1)

$U2=A\ \text{Sin}(2\pi f2), V2=A\ \text{Sin}(2\pi f2+120), W2=A\ \text{Sin}(2\pi f2+240)$   VFD2(Frequency f2)

Voltage on Phase 1 (U1-U2)

$$\sin[2\pi f1] - \sin[2\pi f2] = 2\sin\frac{1}{2}[2\pi([f1-f2)]\cos\frac{1}{2}[2\pi(f1+f2)]$$

The Amplitude modulated output of (f1-f2)/2 as signal and (f1+f2)/2 as carrier
Voltage on Phase 2 (V1-W2)

$$\sin[2\pi f1 + 120] - \sin[2\pi f2 + 240] =$$
$$2\sin\frac{1}{2}[2\pi f1 + 120 - 2\pi f2 - 240]\cos\frac{1}{2}[2\pi f1 + 120 + 2\pi f2 + 240]$$
$$\sin[2\pi f1 + 120] - \sin[2\pi f2 + 240] =$$
$$2\sin\frac{1}{2}[2\pi(f1-f2) - 120]\cos\frac{1}{2}[2\pi(f1+f2) + 360]$$
$$\sin[2\pi f1 + 120] - \sin[2\pi f2 + 240] = 2\sin\frac{1}{2}[2\pi(f1-f2) - 120]$$
$$\cos\frac{1}{2}[2\pi(f1+f2)]$$

The Amplitude modulated output of (f1-f2)/2 and (f1+f2)/2 and (f1-f2)/2, phase shifted by 120° from (U1-U2)
Voltage on Phase 3 (W1-V2)

$$\sin[2\pi f1 + 240] - \sin[2\pi f2 + 120] =$$
$$2\sin\frac{1}{2}[2\pi f1 + 240 - 2\pi f2 - 120]\cos\frac{1}{2}[2\pi f1 + 240 + 2\pi f2 + 120]$$
$$\sin[2\pi f1 + 240] - \sin[2\pi f2 + 120] =$$
$$2\sin\frac{1}{2}[2\pi(f1-f2) + 120]\cos\frac{1}{2}[2\pi(f1+f2) + 360]$$
$$\sin[2\pi f1 + 240] - \sin[2\pi f2 + 120] = 2\sin\frac{1}{2}[2\pi(f1-f2) + 120]$$
$$\cos\frac{1}{2}[2\pi(f1+f2)]$$

The Amplitude modulated output of (f1-f2)/2 and (f1+f2)/2 and (f1-f2)/2, phase shifted by 120° from (V1-W2)

Above three outputs give exactly the same output of amplitude modulation of (f1+f2)/2 and the three phase signals of (f1−f2)/2.

The Control system has to be designed to keep (f1+f2) constant and (f1-f2)/2 at the desired output RPM.

In a Fourth Embodiment

Parallel Rotor, Torque and Load Balancing
Below three issues are identified as main problems of the novel solution.
1. The torque is not constant as it oscillates at the frequency of power input.
2. The load on VFDs are imbalanced when the rotor is stationary.
3. During low speed operation the load variation is very slow on each phase which applies extra strain on the VFDs.

Above issues can be mitigated by having three different stators and rotors powering them with modulated input where carrier frequency is 120° phase shifted.

The torque curves of each segment are 120° phase shifted from each other resulting constant resultant torque on the rotor.

This is like coupling 3 separate motors.

As per the sequence shown in below table three different stators of the motor can be connected to two VFDs so that the carrier frequency of three stator sets are 120° phase shifted.

This also makes the load of each phase in both VFDs balanced avoiding extra strain resolving issue 2 and 3.

Connection Sequence of Winding of the 3 Parallel Stators

| Stator 1 | Phase 1 (U1-U2) | $\sin[2\pi f1] - \sin[2\pi f2] = 2\sin\frac{1}{2}[2\pi([f1-f2)]\cos\frac{1}{2}[2\pi(f1+f2)]$ |
|---|---|---|
| | Phase 2 (V1-W2) | $\sin[2\pi f1 + 120] - \sin[2\pi f2 + 240] = 2\sin\frac{1}{2}[2\pi(f1-f2)-120]\cos\frac{1}{2}[2\pi(f1+f2)]$ |
| | Phase 3 (W1-V2) | $\sin[2\pi f1 + 240] - \sin[2\pi f2 + 120] = 2\sin\frac{1}{2}[2\pi(f1-f2)+120]\cos\frac{1}{2}[2\pi(f1+f2)]$ |
| Stator 2 | Phase 1 (U1-V2) | $\sin[2\pi f1] - \sin[2\pi f2 + 120] = 2\sin\frac{1}{2}[2\pi([f1-f2)-120]\cos\frac{1}{2}[2\pi(f1+f2)+120]$ |
| | Phase 2 (V1-U2) | $\sin[2\pi f1 + 120] - \sin[2\pi f2] = 2\sin\frac{1}{2}[2\pi(f1-f2)+120]\cos\frac{1}{2}[2\pi(f1+f2)+120]$ |
| | Phase 3 (W1-W2) | $\sin[2\pi f1 + 240] - \sin[2\pi f2 + 240] = 2\sin\frac{1}{2}[2\pi(f1-f2)]\cos\frac{1}{2}[2\pi(f1+f2)+120]$ |
| Stator 3 | Phase 1 (U1-W2) | $\sin[2\pi f1] - \sin[2\pi f2 + 240] = 2\sin\frac{1}{2}[2\pi([f1-f2)-240]\cos\frac{1}{2}[2\pi(f1+f2)+240]$ |
| | Phase 2 (V1-V2) | $\sin[2\pi f1 + 120] - \sin[2\pi f2 + 120] = 2\sin\frac{1}{2}[2\pi(f1-f2)]\cos\frac{1}{2}[2\pi(f1+f2)+240]$ |
| | Phase 3 (W1-U2) | $\sin[2\pi f1 + 240] - \sin[2\pi f2] = 2\sin\frac{1}{2}[2\pi(f1-f2)+240]\cos\frac{1}{2}[2\pi(f1+f2)+240]$ |

Will have minimum overshoot and ringing with controlled angular speed when used as a stepper motor Produces very high torque at zero RPM when used as a stepper motor.

No Voltage controlling is required for torque variations in stepper motor control system, only angular position controlling is required. This reduces the cost and complexity of the control system.

As a stepper consumes minimum power at no torque and increase power consumption when torque increased.

Advantages Over Available Technologies
  The RPM of the motor is independent from Power supply frequency, giving ability to produce 0 RPM to very high RPM with fixed frequency input.
  More flexibly in design and optimization as motor operates at single frequency for all speeds.
  Ability to produce high power while being small and lightweight, by operating the motor at high frequency (increased power density).
  Use of concentrated winding gives number of advantages over conventional induction machine as simple construction, low copper losses, higher slot fill factor, reduction in length and induce maximum MMF.
  Ability to provide wide range of speed whilst producing same power output.
  Motor operates at synchronous speed without permanent magnets or brushes, gives ability to develop reliable and cost-effective and robust motors.
  Can be used as stepper motor with high angular resolution.
  More accurate positioning even when variable torques are applied.

It should be appreciated that the scope of the invention is not limited to the specific embodiments described herein and that the inventive concept may be applicable to other applications and embodiments that still envisage use of its essential elements.

The invention claimed is:

1. An electric machine configured to create an oscillating magnetic field across an airgap and to use the oscillating magnetic field to induce current in rotor windings acting as secondary of a transformer, wherein:
   stator windings act as the primary of the transformer, and the oscillating field is generated by amplitude modulation of power input with a control input.

2. An electric machine as in claim 1, wherein the position/rotation of the oscillating magnetic field is controlled by the control input.

3. An electric machine as claimed in claim 2, wherein at least two different frequencies are applied at either end of a said stator winding so that the current flow through each phase winding becomes amplitude modulated, where the carrier frequency is the average of the two frequencies that are applied and the control frequency is half of the difference between the two frequencies.

4. An electric machine as claimed in claim 2, comprising:
three different parallel stators and rotors for connecting to a variable frequency drive so that respective carrier frequencies of the three stator sets are 120° phase shifted providing for the torque curves of each parallel segment to be 120° phase shifted from each other resulting in constant torque on the rotor and load balancing of each phase.

5. An electric machine as claimed in claim 1, wherein windings on the rotor are arranged so that the vector sum of the EMF across all windings are zero (Zero current), when resultant magnetic field of stator and axis of symmetry of rotor windings are parallel, resulting no active power when there is no external torque applied.

6. An electric machine as claimed in claim 5, wherein pairs of rotor windings are symmetrically arranged at axis of a main winding and interconnected in series to create a resultant EMF and current on rotor windings, when axis of symmetry of the windings deviate away from resultant magnetic field of stator due to an external torque.

7. An electric machine as claimed in claim 5, wherein at least two different frequencies are applied at either end of a said stator winding so that the current flow through each phase winding becomes amplitude modulated, where the carrier frequency is the average of the two frequencies that are applied and the control frequency is half of the difference between the two frequencies.

8. An electric machine as claimed in claim 5, comprising:
three different parallel stators and rotors for connecting to a variable frequency drive so that respective carrier frequencies of the three stator sets are 120° phase shifted providing for the torque curves of each parallel segment to be 120° phase shifted from each other resulting in constant torque on the rotor and load balancing of each phase.

9. An electric machine as claimed in claim 6, wherein at least two different frequencies are applied at either end of a said stator winding so that the current flow through each phase winding becomes amplitude modulated, where the carrier frequency is the average of the two frequencies that are applied and the control frequency is half of the difference between the two frequencies.

10. An electric machine as claimed in claim 6, comprising:
three different parallel stators and rotors for connecting to a variable frequency drive so that respective carrier frequencies of the three stator sets are 120° phase shifted providing for the torque curves of each parallel segment to be 120° phase shifted from each other resulting in constant torque on the rotor and load balancing of each phase.

11. An electric machine as claimed in claim 1, wherein windings on the rotor are arranged so that the current across all windings are same and in phase with oscillating magnetic field.

12. An electric machine as claimed in claim 11, comprising:
three different parallel stators and rotors for connecting to a variable frequency drive so that respective carrier frequencies of the three stator sets are 120° phase shifted providing for the torque curves of each parallel segment to be 120° phase shifted from each other resulting in constant torque on the rotor and load balancing of each phase.

13. An electric machine as claimed in claim 1, wherein:
the control input has frequency of 0 Hz, and
the current on each phase is used to determine the angle of deviation between stator magnetic field and a rotor position to achieve required angular position without feedback loop.

14. An electric machine as claimed in claim 13, wherein an angular position is held intact with variable torque, by adjusting a magnetic field position.

15. An electric machine as claimed in claim 14, comprising:
three different parallel stators and rotors for connecting to a variable frequency drive so that respective carrier frequencies of the three stator sets are 120° phase shifted providing for the torque curves of each parallel segment to be 120° phase shifted from each other resulting in constant torque on the rotor and load balancing of each phase.

16. An electric machine as claimed in claim 13, comprising:
three different parallel stators and rotors for connecting to a variable frequency drive so that respective carrier frequencies of the three stator sets are 120° phase shifted providing for the torque curves of each parallel segment to be 120° phase shifted from each other resulting in constant torque on the rotor and load balancing of each phase.

17. An electric machine as claimed in claim 1, wherein:
at least two different frequencies are applied at either end of said stator winding so that the current flow through each phase winding becomes amplitude modulated,
where a frequency of the power input is the average of the two frequencies that are applied, and
a frequency of the control input is half of the difference between the two frequencies.

18. An electric machine as claimed in claim 1, comprising:
three different parallel stators and rotors for connecting to a variable frequency drive so that respective carrier frequencies of the three stator sets are 120° phase shifted providing for the torque curves of each parallel segment to be 120° phase shifted from each other resulting in constant torque on the rotor and load balancing of each phase.

19. A method for controlling an electric machine of the form claimed in claim 1.

* * * * *